United States Patent [19]

Randall

[11] Patent Number: 4,970,861
[45] Date of Patent: Nov. 20, 1990

[54] GEARED ROTARY-TO-LINEAR MOTION CONVERTING SYSTEM FOR BIDIRECTIONAL PUMP DRIVE

[75] Inventor: James F. Randall, Fountain Valley, Calif.

[73] Assignee: Northrop Corporation, Los Angeles, Calif.

[21] Appl. No.: 432,638

[22] Filed: Nov. 7, 1989

[51] Int. Cl.$^5$ .......................................... F16H 35/00
[52] U.S. Cl. ...................................... 60/431; 417/415; 417/536; 74/40; 74/832
[58] Field of Search .................. 417/415, 536; 60/431, 60/432, 479; 74/831, 832, 40, 41

[56] References Cited

U.S. PATENT DOCUMENTS

| | | | |
|---|---|---|---|
| 3,102,484 | 9/1963 | Griswold | 74/832 X |
| 3,102,485 | 9/1963 | Griswold | 74/40 X |
| 3,102,486 | 9/1963 | Griswold | 74/832 X |
| 3,102,487 | 9/1983 | Griswold | 74/832 X |
| 3,160,103 | 12/1964 | Clark | 74/40 X |
| 3,165,062 | 1/1965 | Clark | 74/832 X |
| 3,470,823 | 10/1969 | Seeger | 417/536 X |
| 3,744,936 | 7/1973 | Sadler | 417/536 |
| 4,255,989 | 3/1981 | Dinelli | 74/831 |
| 4,836,755 | 6/1989 | Nitsche et al. | 417/415 X |

Primary Examiner—Carl D. Price
Assistant Examiner—George Kapsalas
Attorney, Agent, or Firm—Terry J. Anderson; Robert B. Block

[57] ABSTRACT

A system for converting the output of a constant speed motor to variable fluidic flow at the ends of a linear actuator comprising a drive gear coupled with an electric motor for concurrent rotation at a fixed rotational speed; a driven gear operatively coupled to the drive gear; a drive train operable in response to rotation of the drive gear to rotate the driven gear, the gear train including adjustment mechanisms for selectively varying the rotational orientation between the drive and driven gears; a pump having a pair of spaced cylinders in axial alignment with pistons coupled through a reciprocal connecting shaft and with a connector rod pinned at its midpoint to the connecting shaft for oscillation; rigid links coupling the ends of the connector rod with the drive and driven gears so that rotation of the drive and driven gears will oscillate the connecting rod and reciprocate the connecting shaft at a speed correlated to the orientation of the adjustment mechanisms of the gear train; and fluidic lines coupling the outputs of the cylinders to the ends of a linear actuator so that adjustment of the gear train will vary the output of the pump to vary the fluidic flow to the linear actuator.

2 Claims, 2 Drawing Sheets

GEARED ROTARY-TO-LINEAR MOTION CONVERTING SYSTEM FOR BIDIRECTIONAL PUMP DRIVE

BACKGROUND OF THE INVENTION

1. Field of the Invention

This invention relates to a motion converting system and, more particularly, to a drive shaft driven at a constant rotational velocity, a driven shaft rotatable in response to the rotation of the drive shaft and coupling mechanisms to vary the rotational position between the drive and driven shafts to generate pressure and motion as a function of the rotational position of the shafts.

2. Description of the Background Art

A linear actuator, sometimes called a positive control actuator, is a device consisting of a piston reciprocable in a cylinder from one end to the other. By providing operating fluid under pressure to one end of the cylinder or the other, the piston can be made to move in one direction or the other in response to the introduction of the pressurized fluid. The movement of the piston can thus be used for creating a mechanical motion in response to the flow of the fluid.

The efficiency of a linear actuator can be increased, in terms of pressure and response time, by increasing the pressure to the ends of the cylinder to the highest pressure desired for a particular application. In such circumstances, however, unusually strong distribution lines would be required and a safety hazard to personnel would be encountered since, for example, a pin-hole leak in a 5,000 p.s.i. line could inject a lethal quantity of hydraulic fluid through a person's skin.

With the advanced technology of electrical motors, there has been an effort to revive electrical actuators as substitutes for the more common hydraulic actuators. Because of their mechanical characteristics, however, it is extremely difficult to get smooth operation and positive positioning of the controlled item through electric actuators.

Hydraulic actuators provide many benefits over electrical actuators. They are, however, generally deficient in that no convenient technique is known for converting the output of a driving motor into a hydraulic output for driving a linear actuator wherein the hydraulic output is readily variable without varying the rotational speed of the driving motor and the fluid is not heated through constant circulation.

The system of the present invention and its mechanism for variably driving a linear actuator with a constant velocity motor was developed in response to the need to improve the efficiency of linear actuators.

Various approaches are disclosed in the patent literature for driving linear actuators and for converting a constant rotational speed motor into variable pressure outputs. By way of example, U.S. Pat. No. 2,508,315 to Van Weenen discloses a hot gas motor whose phase between a piston and displacer changes as the phase angle between two crank shafts changes. Movement of a lever imparts an axial movement of shaft 16 causing the two crank shafts to perform unequal rotary motions due to the particular construction of the gear wheels. This patent is concerned with controlling a Stirling engine through the change of phase position of the driving and driven pistons through spiral gears. The present invention is not directed to a Stirling engine nor does it rely on spiral gears.

The Wallis patent, U.S. Pat. No. 3,482,457, employs a planetary-type phase changing device and moves a valve element in either direction to control the fluid pressure between two lines. Due to the fluid pressure, several motors impart motion upon tracks thereby turning the pinion. This then turns a sun-type gear causing the speeds of a displacer crank shaft and power crank shaft to change relative to each other. This operation causes a phase change between the power and displacer mechanism and thus the output power at the engine's power crankshaft. A significant difference between the Wallis patent and the present invention is that Wallis relies upon a sun-type gear to change the relationship of the driving and driven crank shafts.

In the Vos patent, U.S. Pat. No. 4,357,799, there is disclosed a hot gas reciprocating machine in which the relative phase of the pistons can be adjusted by adjusting two shafts. The adjustment is controlled by a motor which moves a piston causing an arm to move. Another arm, which is fixedly attached to the first arm, must move, thereby turning two shafts by the rotation of associated gears. The Vos patent, unlike the present invention, is directed to a Stirling engine control.

In U.S. Pat. No. 4,395,880 to Berchowitz, another Stirling engine is disclosed with a gearing method employed to change the relative phase of a four-piston system. A pair of shafts are moved axially in the same direction causing gears to rotate in opposite directions thereby rotating the crank pins, also in opposite directions. This changes the phase angle between each pair of thermodynamically coupled pistons. The Berchowitz Stirling engine is controlled through changing angle relationships between the driven and driving crank shafts. This is significantly different from the gear train of the present invention. The first six figures of Berchowitz depict a spiral gear to change relationships, while FIG. 7 employs a sun-type gear similar to that disclosed in the Wallsi patent discussed above.

Lastly, U.S. Pat. No. 4,228,656 to MacGlashan and 4,392,350 to Marks are also of interest. MacGlashan relates to the control of a hot gas engine through changing the phase relationship between the driving and driven crank shafts. Marks relates to a cam operated piston totally unsuitable for the pump configuration of the present invention. The essence of Marks, unlike the present invention, is to provide control for a Stirling engine by changing the phase of the driving and driven cylinders.

As illustrated by the great number of prior patents and commercial devices, efforts are continuously being made in an attempt to improve linear actuators and control mechanisms therefor. Such efforts are being made to render linear actuators and their drives more efficient, reliable, inexpensive and convenient to use. None of these previous efforts, however, provide the benefits attendant with the present invention. Additionally, prior patents and commercial devices do not suggest the present inventive combination of component elements arranged and configured as disclosed herein. The present invention achieves its intended purposes, objects and advantages through a new, useful and unobvious combination of component elements, with the use of a minimum number of functioning parts, at a reasonable or lower cost to manufacture, and by emplying only readily available materials.

Therefore, it is an object of the present invention to provide an improved system for converting the output of a constant speed motor to variable fluidic pressure at the ends of a linear actuator comprising a drive gear coupled with an electric motor for concurrent rotation at a fixed rotational speed; a driven gear operatively coupled to the drive gear; a drive train operable in response to rotation of the drive gear to rotate the driven gear, the gear train including adjustment mechanisms for selectively varying the rotational orientation between the drive and driven gears; a pump having a pair of spaced cylinders in axial alignment with pistons coupled through a reciprocal connecting shaft and with a connector rod pinned at its midpoint to the connecting shaft for oscillation; rigid links coupling the ends of the connector rod with the drive and driven gears so that rotation of the drive and driven gears will oscillate the connecting rod and reciprocate the connecting shaft at a speed correlated to the orientation of the adjustment mechanisms of the gear train; and fluidic lines coupling the outputs of the cylinders to the ends of a linear actuator so that adjustment of the gear train will vary the output of the pump to vary the fluidic flow from zero to maximum and a constant pressure to control the speed of the linear actuator.

It is a further object of the present invention to drive linear actuators from a variable volume fluidic source.

It is a further object of the present invention to convert the output of a constant speed motor into a variable volume output.

It is a further object of the present invention to adjust the rotational position of a gear train for converting the output of a drive motor into a variable volume feed while maintaining the drive motor at a constant rotational velocity.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved system for converting the output of a constant speed motor to variable fluidic flow at the ends of a linear actuator comprising a drive gear coupled with an electric motor for concurrent rotation at a fixed rotational speed; a driven gear operatively coupled to the drive gear; a drive train operable in response to rotation of the drive gear to rotate the driven gear, the gear train including adjustment mechanisms for selectively varying the rotational orientation between the drive and driven gears; a pump having a pair of spaced cylinders in axial alignment with pistons coupled through a reciprocal connecting shaft and with a connector rod pinned at its midpoint to the connecting shaft for oscillation; rigid links coupling the ends of the connector rod with the drive and driven gears so that rotation of the drive and driven gears will oscillate the connecting rod and reciprocate the connecting shaft at a speed correlated to the orientation of the adjustment mechanisms of the gear train; and fluidic lines coupling the outputs of the cylinders to the ends of a linear actuator so that adjustment of the gear train will vary the output of the pump to vary the fluidic flow to the linear actuator. The fluid lines define a closed hydraulic loop and further include a fluidic reservoir and an accumulator in operative association with the fluidic lines. The system further includes control means associated with the fluidic lines for directing the flow of fluid to one end of the linear actuator or the other.

The invention may also be incorporated into an improved gear train for use in driving a pump at a variable output from a constant velocity input motor, the improved gear comprising a planet-type drive gear powered by a motor at a constant rotational velocity about a first planet-type axis; a pair of sun-type gears independently rotatable about a common sun-type axis offset from the first planet-type axis, the first sun-type gear being rotatable in respnse to the rotation of the drive gear; a driven gear rotatable about a second planet-type axis offset from the first planet-type gear axis and sun-type gear axis and rotable by the second sun-type gear; and an adjustment mechanism including a pair of adjustment gears rotatable together and in meshing contact with the two sun-type gears for rotation therewith, the adjustment mechanism also including a lever pivotable about the sun-type gear axis to modify the rotational orientation of the drive gear with respect to the driven gear. The adjustment gears include exterior teeth in meshing contact with the first sun-type gear and interior teeth in meshing contact with the second sun-type gear. The first sun-type gear is in meshing contact with the first planet-type gear and the second sun-type gear is in meshing contact with the second planet-type gear. The lever is pivotally coupled to a shaft supporting the sun-type gears and with the adjustment gear coupled to the lever at a location remote from the sun-type gear axis. The gear train further includes rigid links coupling the first and second planet-type gears with a mechanism for powering a pump to be driven at an output speed correlated to the orientation of the lever.

Lastly, the invention may also be incorporated into an improved pump for providing variable output flow from a constant velocity motor including: a pair of spaced, axially aligned cylinders; a piston located in each cylinder; a connecting shaft coupling the pistons; a connector rod pivotally supported on the connecting shaft adapted to oscillate about its midpoint; constant velocity drive means coupled to the connector rods so that the oscillation of the connector rod will drive the connecting shaft and vary the pressure output of the pump in response to the adjusted orientation of the drive means with respect to the connector rod. The pump further includes links coupling the ends of the connector rod with gears of a gear train. The gears of the gear train also include a drive gear and a driven gear and means to adjust the rotational orientation between the drive and driven gears to thereby vary the output of the pump from a constant input motor.

The foregoing has outlined rather broadly the more pertinent and important features of the present invention in order that the detailed description of the invention that follows may be better understood so that the present contribution to the art can be more fully appreciated. Additional features of the invention will be described hereinater which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar reference characters refer to similar parts throughout the several Figures.

DETAILED DESCRIPTION OF THE INVENTION

Figure 1:
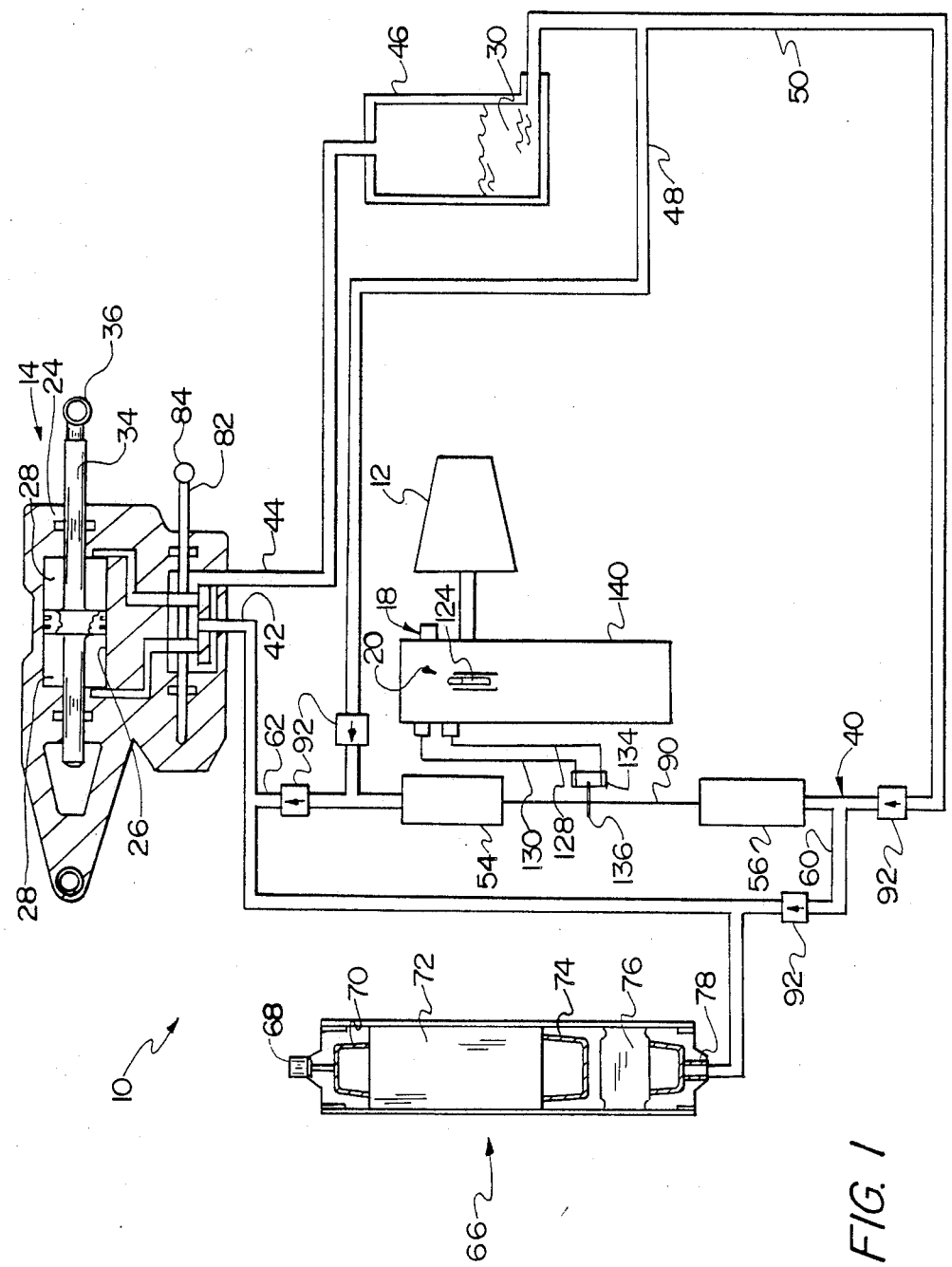
FIG. 1 is a schematic illustration of a system having a linear actuator, a pump and a gear train constructed in accordance with the principles of the present invention.

With particular reference to the Figures, there is shown in FIG. 1 a system 10 for converting the constant velocity rotational movement of an electric motor 12 to variable and selected reciprocation of the piston of a linear actuator 14. Between the motor 12 and the linear actuator 14 are a pump 16 and a gear train functioning as a control mechanism 18 with adjustment mechanisms 20 for driving the pump 16 at any one of a plurality of outputs as a function of the adjusted orientation of the adjusment mechanisms 20. The variations in output are variations of fluid volume which result in variations of fluid flow. The adjustments can go from zero output to flull maximum as determined by the size and power of the system 10. Except for the pump 16 and drive train 18, the system 10 is of a conventional design.

The linear actuator 14 includes a housing or cylinder 24 having contained therein a piston 26 movable from one end of the actuator cylinder 24 to the other. At opposite ends of the actuator cylinder 24, beyond the axial ends of the movable piston 26, are a pair of chambers 28 adapted to receive an operating fluid 30 under pressure to move the piston 26 toward the opposite end of the actuator cylinder. The fluid 30 is preferably a hydraulic oil engineered for such purposes. By controlling the fluid input to the end chambers 28 of the actuator cylinder 24, the piston can be made to move more or less rapidly, with constant force, to any varying amount, as is required for proper operation of the system 10. The piston support shaft 34 of the linear actuator 14 is appropriately journaled in the cylinder ends and coupled to an external thrust member 36 for operating another element to be controlled by the system 10. The chambers 28 at the opposite ends of the actuator cylinder are coupled with fluidic lines 40 for conveying the motion imparting fluid 30 throughout the system 10.

The fluid lines 40 of the system 10 include a feed line 42 and a return line 44. The return line 44 feeds returned fluid through a reservoir 46 for storing an excess quantity of operating fluid. The single return line 44 then divides into two lines 48 and 50 for feeding both cylinders 54 and 56 of the pump 16. The output lines 60 and 62 of the pump cylinders 54 and 56 recombine to the single feed line 42 prior to feeding the linear actuator 14. An accumulator 66 is preferably placed in a line between one cylinder of the pump and the linear actuator for further control of the pressure of the system 10. The accumulator 66 includes a gas valve 68, end cap 70, gas chamber piston 74, fluid chamber 76 and discharge port 78 all functioning in a manner conventional in the linear actuator art.

Between the linear actuator 14 and its associated input and output fluid lines, there are control mechanisms 82 for allowing the pressurized fluid of the lines to be individually controlled for directing the operating fluid to or from the end chambers 28 of the linear actuator 14. Such control mechanisms 82 are conventional in the art for controlling the movement of the piston of the linear actuator as well as its servo-control end 84.

Feed to the opposite ends of the cylinder 24 of the linear actuator 14 is by the pump 16. The pump is formed of a pair of cylinders 54 and 56 each having its own pump piston 88 linearly reciprocable therein. The pump cylinders are in axial alignment and coupled by a common connecting shaft 90 so that reciprocation of the pump pistons 88 will be in synchronism to alternately apply forces to the fluid within one pump cylinder or the other. Each pump cylinder 88 is fluidically coupled to the linear actuator through the fluidic lines which are provided with one-way valves 92 adjacent to both sides of the lines at the pump cylinders 54 and 56 for insuring the proper directional flow of the operating fluids. In this manner, a rapid reciprocation of the pump pistons 88 will generate a maximum fluid flow and pressure in the lines to and from the associated actuator cylinder for driving the actuator piston 26 away from the chamber 28. Similar valves 92 and coupling line at opposite ends of both pump cylinders 54 and 56 are utilized to properly feed the opposite ends of the cylinder of the linear actuator 14 for movement of the linear actuator piston 26 to effect the desired speed, force and positioning.

Figure 2:
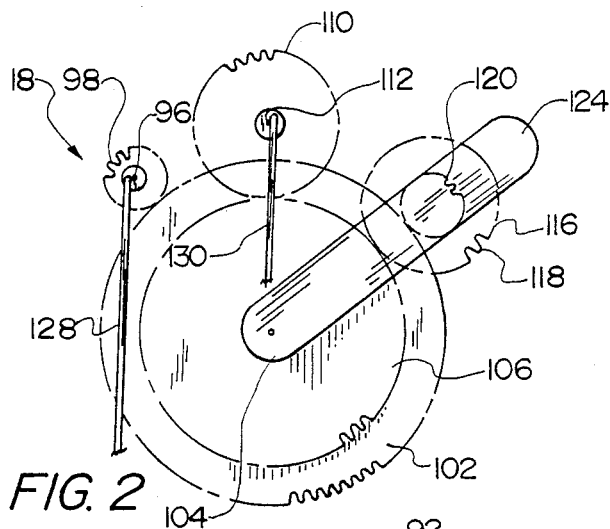
FIG. 2 is a plan view of the mechanisms for converting the constant velocity rotational movement of the drive motor to a variable fluidic output for driving a linear actuator.
Figure 3:
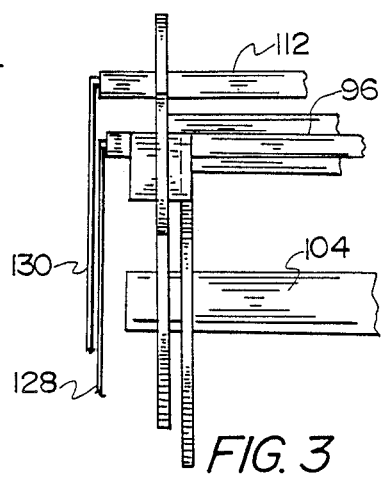
FIG. 3 is a side elevational view of the mechanism of FIG. 2.
Figure 4:
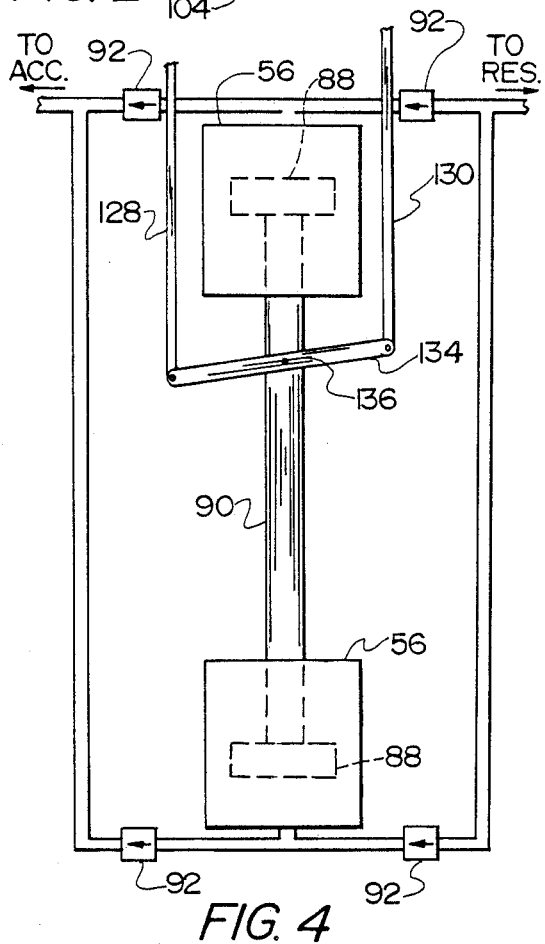
FIG. 4 is an enlarged planview of the pump as shown in FIG. 1.

The drive train 18 as shown in FIG. 2 constitutes an adjustment and control mechanisms for generating and varying the flow of fluid from the pump to the actuator 14. The control mechanisms 18 include a drive motor 12 rotating a first drive shaft 96 with a first planet-type gear 98 about a first fixed axis of rotation. The teeth of the first planet-type gear 98 mesh with the teeth of a first sun-type gear 102 which is independently rotatable about a sun-type gear shaft 104 having a fixed sun-type gear axis of rotation offset from the first planet-type gear axis. A second sun-type gear 106 is independently rotatable upon the sun-type gear shaft 104 about the common sun-type gear axis of rotation.

A second planet-type gear 110 is rotatable upon a shaft 112 about a second fixed axis of rotation offset from both the first planet-type gear axis and the sun-type gear axis. The teeth of the second planet-type gear 110 mesh with the teeth of the second sun-type gear 106 which is independently rotatable about a sun gear shaft 104 about the fixed sun-type gear axis of rotation.

A third plant-type gear 116 is mounted for rotation upon a third axis of rotation offset from the sun-type gear axis and the other two planet-type gear axes. This third planet-type gear axis of rotation is variable, shiftable by an operator about the sun-type gear axis. The third planet-type gear 116 is an adjustment gear with two sets of gears of different sizes which are rotatable together. The radially exterior teeth 118 of the adjustment gear are in meshing contact with the second sun-type gear 106 while its radially interior teeth 120 are in meshing contact with the teeth of the first sun-type gear 102. The interior and exterior teeth of the adjustment gear 116 are coupled for concurrent rotation so that rotation of gear 116 effects concurrent rotation with the drive planet-type gear 98 and driven planet-type gear 110. In addition, movement of the axis of the adjustment gear 116 adjusts the rotational orientation of the drive and driven gears 98 and 110.

In operation and use, the rotation of the first or drive planet-type gear 98 will rotate the first sun-type gear 102. The rotation of the first sun-type 102 will rotate the radially interior teeth 120 of the adjustment gear 116 which also rotates the radially exterior teeth 118 of the adjustment gear 116. This in turn rotates the second or driven planet-type gear 110. Consequently, rotation of the drive gear 98 drives the driven gear 110 so that the drive and driven shafts 96 and 112 of the gears 98 and 110 are rotated in the same direction and at the same rotational velocity.

Operatively positioned with respect to these various gears is a lever 124 pinned to the sun shaft 104 for rotation about the axis of the sun gears 102 and 106. It may be moved rotationally left or right, clockwise or counterclockwise, as shown in FIG. 2. It has rotationally journaled at an intermediate point the rotatable adjustment gear 116 with its interior teeth 120 cooperable with the teeth of gear 102 and with its exterior teeth 118 cooperable with gear 106. Movement of lever 124 in one direction or the other will thus cause the two sets of teeth of gear 116 to move at the same rotational speed. But since they contact gears 102 and 106 at further distances from their common axis, gear 106 will move a greater rotational amount than gear 102 upon any movement of lever 124. The movement of lever 124 can thus cause the movement of driven gear 110 with respect to driving gear 98 any particular amount. As such, the drive and driven gears are in phase or out of phase to any particular amount.

Pinned to the exterior surfaces of gears 98 and 110 are the upper ends of rigid links 128 and 130. The rigid links 128 and 130 are rigid members pivotally coupled at their upper ends to shafts 96 and 112 equal distances from their axes of rotation. At their lower ends the rigid links 128 and 130 are pivotally coupled to the connector rod 134 at equal distances from its pivot point. The pivot point is on a pin 136 extending through the connecting shaft 90. In the FIG. 1 illustration the gear train 18 is located within the housing 140 but with the motor 12, lever 124, and the ends of shafts 96 and 112 extending therethrough. The various shafts of the gear train 118 are journaled in the walls of housing 140.

Upon energizing the electric motor 12 to rotate gear 98 and, in turn, driven gear 110, the shafts 96 and 112 will be given rotational motion to reciprocate rigid links 128 and 130 equally and oppositely and thus rock the connector rod 134. When the pivot pins of shafts 96 and 112 are 180 degrees out of phase and the motor 12 is energized, the connector rod 134 will simply rock about its pivot pin 136 on the connecting shaft 90 so that the connecting shaft 90 does not reciprocate. In this manner, the electric motor 12 can be driven at any speed but no motion of the connecting shaft 90 occurs and no pressure is generated in the pump cylinders 54 and 56.

Fluid does not flow. When, however, lever 124 is rotated in one direction or the other, it will cause a rotational reorientation of gear 110 with respect to gear 98. This will put the pivot pins of the upper ends of the rigid links 128 and 130 as well as their lower ends out of phase so that the rigid links 128 and 130 will oscillate as before. But being out of phase, the pivot pin 136 on the connecting shaft 90 will be oscillated and cause reciprocation of the connecting shaft 90. Any adjustment of lever 124 is possible up to the point where the lower ends of the rigid links have their pivot point at the same rotational position. In this orientation, the oscillation of the connecting shaft 90 about the pivot pin 136 will be the same as before, but the reciprocation of the connecting shaft 90 along its length will be the greatest for effecting the greatest throw of the pump cylinders 54 and 56 and for generating the greatest amount of fluid flow in the lines of the system.

As can be understood, the invention of this application allows for an electric motor rotating at a common fixed speed to drive the connecting shaft at any one of a plurality of throw lengths to thereby generate different fluid flow rates at constant pressure for powering a linear actuator. The degree of motion of the connecting shaft can be from zero to a full max as a function of the parameters of the system.

The present disclosure includes that contained in the appended claims as well as that of the foregoing description. Although this invention has been described in its preferred forms with a certain degee of particularity, it is understood that the present disclosure of the preferred form has been made only by way of example and numerous changes in the details of construction and combination and arrangement of parts may be resorted to without departing from the spirit and scope of the invention.

Now that the invention has been described, What is claimed is:

1. A system for converting the output of a constant speed motor to variable fluidic flow at the ends of a linear actuator comprising:
   a drive gear powered by a motor at a constant rotational velocity about a first axis;
   a pair of intermediate gears independently rotatable about a common second axis offset from the first axis, the first gear of the pair being rotatable in response to the rotation of the drive gear;
   a driven gear rotatable about a third axis offset from the first and second axes and rotatable by the second gear of the pair;
   an adjustment mechanism including a pair of adjustment gears rotatable together about a common fourth axis offset from the other three axes and in meshing contact with the two gears of the pair for rotation therewith, the adjustment mechanism also including a positioning lever pivotable about the second axis, the movement of said positioning lever effecting a differential angular orientation between said intermediate gears about said second axis and a differential angular positioning of said drive and driven gears about their respective axes;
   a pump having a pair of spaced cylinders in axial alignment with pistons coupled through a reciprocal connecting shaft and with a connector rod pinned at its midpoint to the connecting shaft for oscillation;
   rigid links eccentrically coupling the ends of the connector rod with the drive and driven gears so that rotation of the drive and driven gears will oscillate the connecting rod and reciprocate the connecting shaft a distance correlated to the orientation of the adjustment mechanism of the gear train to provide controlled variable volume pump outputs at constant pressures; and fluidic lines coupling the outputs of the pump cylinders to the ends of a linear actuator so that adjustment of the gear train will vary the output of the pump to vary the fluidic flow to the linear actuator.

2. A control system for positioning control elements of an aircraft in which the output of a constant speed motor is utilized to generate variable fluidic flow in a fluid system, in which variable fluidic flow is in turn utilized to control the positioning of a linear actuator operatively connected with an aircraft control element comprising:

an aircraft element movable in response to a control system to control certain functions of the aircraft, a linear actuator operatively connected to said aircraft control element for positioning said control element, said linear actuator including a double acting piston movable in an axial direction within an actuator cylinder, a linear actuator servo control operatively associated with said linear actuator to control the positioning of said linear actuator, a pump having dual cylinders in spaced axial alignment with each other and including a piston within each of said spaced axially aligned cylinders, said pistons being coupled together by a connector shaft to facilitate tandem synchronized reciprocal movement of said pistons, fluid conduit means operatively connecting the respective fluid outputs of said pump cylinders with said linear actuator servo control and said linear actuator to position said actuator in response to the respective volume of fluid output from said pump cylinders, a bellcrank connecting rod connected at its mid point to said piston connecting shaft for rotational movement about an axis perpendicular to the axis of said piston connecting shaft, a drive gear positioned to rotate about a first axis;

a pair of intermediate gears independently rotatable about a common second axis offset from the axis of said drive gear, the first gear of the intermediate pair being rotatable and driven in response to the rotation of the drive gear;

a driven gear rotatable about a third axis offset from the first drive gear axis and the common intermediate gear second axes and rotatable by the second intermediate driven gear of the pair;

a pair of transfer gears rotatable together about a common fourth axis offset from the other three axes and in meshing contact with the two gears of the intermediate pair for rotation respectively therewith;

rigid connector links each connected at one end thereof to the bellcrank connecting rod and at the other ends thereof respectively with the drive and driven gears and eccentrically located from the respective axes of said drive and driven gears to oscillate the connecting rod and reciprocate the connecting shaft in response to rotation of said drive and driven gears at speeds correlated to the constant angular velocities of the rotation of said pair of intermediate gears about said second axis of the gear train;

an adjustment mechanism including a positioning lever pivotable about the second axis and connected to the axis of rotation of said transfer gears to modify the angular orientation of said transfer gears about said second axis;

the positioning of said adjustment mechanism and said transfer gears producing a differential angular positioning between said pair of intermediate gears to in turn produce a differential angular positioning between said drive gear and said driven gear and the synchronous positioning of the respective eccentrics thereon; and a motor operatively connected to said drive gear to drive said drive gear at a continuous and constant velocity about its axis to reciprocate said connector shaft and said pump cylinders in response to the positioning of said adjustment mechanism to produce variable output pump volumes at constant pressures, said controlled reciprocation in turn producing predetermined volume outputs by said cylinders to effect predetermined displacements of said linear actuator and said aircraft control element.

* * * * *